(12) United States Patent
Prazak et al.

(10) Patent No.: US 10,331,295 B2
(45) Date of Patent: Jun. 25, 2019

(54) VISUALIZATION OF AN OBJECT USING A VISUAL QUERY SYSTEM

(71) Applicant: The Boeing Company, Chicago, IL (US)

(72) Inventors: Nikoli E. Prazak, Renton, WA (US); John Carney Gass, Sammamish, WA (US)

(73) Assignee: The Boeing Company, Chicago, IL (US)

(*) Notice: Subject to any disclaimer, the term of this patent is extended or adjusted under 35 U.S.C. 154(b) by 330 days.

(21) Appl. No.: 15/003,802

(22) Filed: Jan. 22, 2016

(65) Prior Publication Data

US 2016/0139769 A1 May 19, 2016

Related U.S. Application Data

(63) Continuation of application No. 13/852,063, filed on Mar. 28, 2013, now abandoned.

(51) Int. Cl.
*G06T 17/00* (2006.01)
*G06F 3/0481* (2013.01)
(Continued)

(52) U.S. Cl.
CPC ........ *G06F 3/04815* (2013.01); *G06F 3/0482* (2013.01); *G06F 3/04842* (2013.01); *G06F 16/00* (2019.01); *G06F 16/532* (2019.01); *G06F 17/5095* (2013.01); *G06F 2217/46* (2013.01); *Y02T 90/50* (2018.05)

(58) Field of Classification Search
USPC ................................ 345/419, 424; 715/764
See application file for complete search history.

(56) References Cited

U.S. PATENT DOCUMENTS

| | | |
|---|---|---|
| 3,744,917 A | 7/1973 | Craig |
| 4,815,190 A | 3/1989 | Haba et al. |

(Continued)

FOREIGN PATENT DOCUMENTS

| | | |
|---|---|---|
| CN | 1576829 A | 2/2005 |
| CN | 1609852 A | 4/2005 |

(Continued)

OTHER PUBLICATIONS

Canadian Intellectual Property Office Examination Search Report, dated Aug. 29, 2016, regarding Application No. 2,839,914, 6 pages.

(Continued)

*Primary Examiner* — Kimbinh T Nguyen
(74) *Attorney, Agent, or Firm* — Yee & Associates, P.C.

(57) ABSTRACT

A computer-implemented method for visualizing data about an object. A hierarchy of image blocks is generated using an action scheme and a part. Instructions identifying a hierarchy of image blocks and the action scheme are generated. The hierarchy of image blocks is communicated to a graphical user interface. An image area is identified in an image block in the hierarchy of image blocks in the graphical user interface. A query is generated to identify a location of the part within the object. The query is based on a type of search, a spatial region, and the action scheme. An indicator representing the location of the part identified by the query is displayed.

20 Claims, 12 Drawing Sheets

(51) Int. Cl.
    *G06F 3/0484*    (2013.01)
    *G06F 3/0482*    (2013.01)
    *G06F 17/50*     (2006.01)
    *G06F 16/00*     (2019.01)
    *G06F 16/532*    (2019.01)

(56) References Cited

U.S. PATENT DOCUMENTS

| | | |
|---|---|---|
| 4,894,908 A | 1/1990 | Haba et al. |
| 5,023,805 A | 6/1991 | Aune |
| 5,367,552 A | 11/1994 | Peschmann |
| 5,544,558 A | 8/1996 | Hughes |
| 5,771,043 A | 6/1998 | Nigawara et al. |
| 5,822,218 A | 10/1998 | Moosa et al. |
| 5,960,104 A | 9/1999 | Conners |
| 6,000,610 A | 12/1999 | Talbott et al. |
| 6,167,394 A | 12/2000 | Leung et al. |
| 6,240,328 B1 | 5/2001 | LaLonde et al. |
| 6,345,207 B1 | 2/2002 | Nitta et al. |
| 6,378,387 B1 | 4/2002 | Froom |
| 6,381,509 B1 | 4/2002 | Thiel et al. |
| 6,418,189 B1 | 7/2002 | Schafer |
| 6,477,471 B1 | 11/2002 | Hedstrom et al. |
| 6,481,096 B2 | 11/2002 | Lehmker |
| 6,487,479 B1 | 11/2002 | Nelson |
| 6,597,761 B1 | 7/2003 | Garms, III |
| 6,604,681 B1 | 8/2003 | Burke |
| 6,637,266 B1 | 10/2003 | Froom |
| 6,912,507 B1 | 6/2005 | Phillips |
| 6,941,204 B2 | 9/2005 | Halm |
| 7,042,346 B2 | 5/2006 | Paulsen |
| 7,050,894 B2 | 5/2006 | Halm et al. |
| 7,103,434 B2 | 9/2006 | Chernyak |
| 7,167,583 B1 | 1/2007 | Lipson et al. |
| 7,302,443 B2 | 11/2007 | Nakajima et al. |
| 7,333,991 B2 | 2/2008 | Hill et al. |
| 7,343,213 B1 | 3/2008 | Burgess |
| 7,353,192 B1 | 4/2008 | Ellis et al. |
| 7,365,747 B2 | 4/2008 | Finlayson et al. |
| 7,366,688 B2 | 4/2008 | Kwasniewski et al. |
| 7,644,371 B2 * | 1/2010 | Robertson ......... G06F 17/30398 715/805 |
| 7,646,384 B2 | 1/2010 | Anderson et al. |
| 7,650,202 B2 | 1/2010 | Strohband et al. |
| 7,804,498 B1 * | 9/2010 | Graham ............... G06T 11/206 345/419 |
| 7,933,441 B2 | 4/2011 | Numata |
| 7,954,070 B2 | 5/2011 | Plocher |
| 8,027,745 B1 | 9/2011 | Freeze |
| 8,051,547 B2 | 11/2011 | Toh |
| 8,079,130 B2 | 12/2011 | Hardouin-Finez |
| 8,116,529 B2 | 2/2012 | Edwards |
| 8,352,904 B2 | 1/2013 | Hodges |
| 8,482,412 B2 | 7/2013 | Majoros et al. |
| 8,527,348 B2 | 9/2013 | Petrov |
| 8,571,951 B2 | 10/2013 | Diana et al. |
| 8,606,540 B2 | 12/2013 | Haisty et al. |
| 8,610,761 B2 | 12/2013 | Haisty et al. |
| 8,620,627 B2 | 12/2013 | Nakhle et al. |
| 8,791,823 B2 | 7/2014 | Xu |
| 8,849,636 B2 | 9/2014 | Becker |
| 8,860,760 B2 | 10/2014 | Chen |
| 8,914,149 B2 | 12/2014 | Safa-Bakhsh et al. |
| 9,488,592 B1 | 11/2016 | Maresca et al. |
| 2002/0007225 A1 | 1/2002 | Costello et al. |
| 2002/0026296 A1 | 2/2002 | Lohmann |
| 2002/0071524 A1 | 7/2002 | Renkart |
| 2002/0168083 A1 | 11/2002 | Garms |
| 2002/0198764 A1 | 12/2002 | Schorno |
| 2003/0055619 A1 | 3/2003 | Singarajan |
| 2003/0055812 A1 | 3/2003 | Williams et al. |
| 2003/0083794 A1 | 5/2003 | Halm |
| 2003/0120472 A1 | 6/2003 | Lind |
| 2003/0149500 A1 | 8/2003 | Farque |
| 2003/0158702 A1 | 8/2003 | Busche et al. |
| 2004/0068350 A1 | 4/2004 | Tomson |
| 2004/0090472 A1 * | 5/2004 | Risch ............... G06F 17/30716 715/853 |
| 2004/0093100 A1 | 5/2004 | Gleis |
| 2004/0098151 A1 | 5/2004 | Carlucci et al. |
| 2004/0128117 A1 | 7/2004 | Crandall |
| 2004/0162651 A1 | 8/2004 | Halm |
| 2005/0044011 A1 | 2/2005 | Deal |
| 2005/0149216 A1 | 7/2005 | Popplewell |
| 2005/0223032 A1 | 10/2005 | Shan et al. |
| 2005/0228708 A1 | 10/2005 | Catala et al. |
| 2005/0278062 A1 | 12/2005 | Janert et al. |
| 2006/0106682 A1 | 5/2006 | Van Dyck et al. |
| 2006/0119601 A1 | 6/2006 | Finlayson et al. |
| 2007/0013709 A1 | 1/2007 | Charles et al. |
| 2007/0106410 A1 | 5/2007 | Bouffiou et al. |
| 2007/0106414 A1 | 5/2007 | Strohband et al. |
| 2007/0219645 A1 | 9/2007 | Thomas et al. |
| 2008/0052046 A1 | 2/2008 | Botvinnik |
| 2008/0140270 A1 | 6/2008 | Davis et al. |
| 2008/0155807 A1 | 7/2008 | Toh |
| 2008/0187897 A1 | 8/2008 | Franzen et al. |
| 2008/0205763 A1 | 8/2008 | Marsh et al. |
| 2008/0209342 A1 | 8/2008 | Taylor |
| 2008/0234850 A1 | 9/2008 | Bowling et al. |
| 2008/0252311 A1 | 10/2008 | Koh et al. |
| 2008/0270946 A1 * | 10/2008 | Risch ............... G06F 17/30716 715/848 |
| 2008/0276201 A1 * | 11/2008 | Risch ............... G06F 17/30716 715/853 |
| 2008/0294395 A1 | 11/2008 | Lu |
| 2008/0301012 A1 | 12/2008 | Cogswell et al. |
| 2009/0013281 A1 | 1/2009 | Helman et al. |
| 2009/0031236 A1 * | 1/2009 | Robertson ......... G06F 17/30398 715/765 |
| 2009/0112349 A1 | 4/2009 | Cobb |
| 2009/0138230 A1 | 5/2009 | Davies et al. |
| 2009/0144962 A1 | 7/2009 | Hardouin-Finez |
| 2009/0192644 A1 | 7/2009 | Meyer et al. |
| 2009/0228133 A1 | 9/2009 | Loda |
| 2009/0248545 A1 | 10/2009 | Robinson et al. |
| 2009/0312897 A1 | 12/2009 | Jamrosz et al. |
| 2010/0010794 A1 | 1/2010 | Sweers |
| 2010/0042952 A1 | 2/2010 | Geesey |
| 2010/0097195 A1 | 4/2010 | Majoros et al. |
| 2010/0114641 A1 | 5/2010 | Coffman et al. |
| 2010/0125468 A1 | 5/2010 | Avery et al. |
| 2010/0161095 A1 | 6/2010 | Lindgren |
| 2010/0175013 A1 | 7/2010 | Krauter et al. |
| 2010/0241380 A1 | 9/2010 | Cookson |
| 2010/0299304 A1 | 11/2010 | Vasudevan |
| 2011/0022208 A1 | 1/2011 | Bouffiou et al. |
| 2011/0041088 A1 | 2/2011 | Mason et al. |
| 2011/0046763 A1 | 2/2011 | Tsuchiya et al. |
| 2011/0087466 A1 | 4/2011 | Vossmann |
| 2011/0087513 A1 | 4/2011 | Floyd et al. |
| 2011/0125303 A1 | 5/2011 | Rollman et al. |
| 2011/0137443 A1 | 6/2011 | Farahani |
| 2011/0166824 A1 | 7/2011 | Hasity et al. |
| 2011/0169924 A1 | 7/2011 | Haisty et al. |
| 2011/0172795 A1 | 7/2011 | Hansen et al. |
| 2011/0251711 A1 | 10/2011 | Goel |
| 2011/0288840 A1 | 11/2011 | Kropinski et al. |
| 2011/0311097 A1 | 12/2011 | Kitagawa et al. |
| 2012/0007852 A1 | 1/2012 | Morate et al. |
| 2012/0030926 A1 | 2/2012 | Toh et al. |
| 2012/0050522 A1 | 3/2012 | Slyck et al. |
| 2012/0062725 A1 | 3/2012 | Charles et al. |
| 2012/0071998 A1 | 3/2012 | Davies et al. |
| 2012/0075343 A1 | 3/2012 | Chen et al. |
| 2012/0100520 A1 | 4/2012 | Jo et al. |
| 2012/0130521 A1 | 5/2012 | Kohlhoff |
| 2012/0140041 A1 | 6/2012 | Burgunder et al. |
| 2012/0154265 A1 | 6/2012 | Kim et al. |
| 2012/0249588 A1 | 10/2012 | Tison et al. |
| 2012/0303336 A1 | 11/2012 | Becker et al. |
| 2012/0304059 A1 | 11/2012 | McCloskey |
| 2012/0306666 A1 | 12/2012 | Xu et al. |
| 2013/0006409 A1 | 1/2013 | Evans et al. |

(56) References Cited

U.S. PATENT DOCUMENTS

| | | | |
|---|---|---|---|
| 2013/0036031 A1 | 2/2013 | Hutchinson et al. | |
| 2013/0117742 A1 | 5/2013 | Newell | |
| 2013/0124150 A1 | 5/2013 | Kim et al. | |
| 2013/0132373 A1 | 5/2013 | Huang et al. | |
| 2013/0239330 A1 | 9/2013 | Newlin et al. | |
| 2013/0261876 A1 | 10/2013 | Froom | |
| 2013/0297633 A1 | 11/2013 | Edwards | |
| 2014/0013263 A1 | 1/2014 | Bailiang | |
| 2014/0089030 A1 | 3/2014 | Bell | |
| 2014/0245206 A1* | 8/2014 | Senesac | G06F 17/5095 715/771 |
| 2014/0365943 A1* | 12/2014 | Senesac | G06Q 50/28 715/771 |
| 2015/0062123 A1 | 3/2015 | Yuen | |
| 2015/0134274 A1 | 5/2015 | Froom | |

FOREIGN PATENT DOCUMENTS

| | | |
|---|---|---|
| CN | 1689000 A | 10/2005 |
| CN | 1983268 A | 6/2006 |
| CN | 101174137 A | 5/2008 |
| CN | 101329624 A | 12/2008 |
| CN | 102542398 A | 7/2012 |
| CN | 102789520 A | 11/2012 |
| CN | 102799619 A | 11/2012 |
| CN | 103116818 A | 5/2013 |
| DE | 102005005266 A1 | 8/2006 |
| EP | 1321869 A2 | 6/2003 |
| EP | 2052807 A1 | 4/2009 |
| EP | 2431915 A2 | 3/2012 |
| EP | 2458562 A1 | 5/2012 |
| EP | 2790136 A1 | 10/2014 |
| GB | 2327289 A | 1/1999 |
| JP | H10254941 A | 9/1998 |
| JP | H10269292 A | 10/1998 |
| JP | 2004206352 A | 7/2004 |
| JP | 2007095039 A | 4/2007 |
| JP | 2008288852 A | 11/2008 |
| JP | 201153999 A1 | 9/2011 |
| JP | 2012039544 A | 2/2012 |
| JP | 2012104124 A | 5/2012 |
| JP | 2012526979 A | 11/2012 |
| JP | 2013505637 A | 2/2013 |
| WO | WO0049544 A2 | 8/2000 |
| WO | WO2008143148 A1 | 11/2008 |
| WO | WO2008144797 A1 | 12/2008 |
| WO | WO2011056196 A1 | 5/2011 |
| WO | WO2012166545 A2 | 12/2012 |
| WO | WO2013061156 A2 | 5/2013 |
| WO | WO2013078156 A1 | 5/2013 |
| WO | WO2013078265 A | 5/2013 |

OTHER PUBLICATIONS

Japanese Preliminary Examination Report, dated Aug. 5, 2016, regarding Application No. 2014-060864, 9 pages.
Final Office Action, dated Nov. 20, 2015, regarding U.S. Appl. No. 13/890,347, 38 pages.
Extended European Search Report, dated Feb. 7, 2017, regarding Application No. 14725826.3, 8 pages.
State Intellectual Property Office of PRC Notification of First Office Action, dated Nov. 30, 2016, regarding Application No. 201480025761.0, 11 pages.
Office Action, dated Mar. 28, 2016, regarding U.S. Appl. No. 13/835,262, 21 pages.
European Patent Office Communication, dated Jan. 26, 2016, regarding Application No. 14159760.9, 5 pages.
Notices of Reasons for Rejection and English Translation, dated Jan. 29, 2016, regarding Japanese Patent Application No. 2014-060864, 7 pages.
Extended European Search Report, dated Jun. 17, 2016, regarding Application No. EP15176304.2, 9 pages.
Final Office Action, dated May 6, 2016, regarding U.S. Appl. No. 13/861,678, 33 pages.
Notice of Allowance, dated Oct. 4, 2016, regarding U.S. Appl. No. 13/798,964, 51 pages.
Final Office Action, dated Oct. 20, 2016, regarding U.S. Appl. No. 13/785,616, 43 pages.
Office Action, dated Oct. 3, 2016, regarding U.S. Appl. No. 13/890,347, 60 pages.
Office Action, dated Dec. 14, 2016, regarding U.S. Appl. No. 13/861,678, 29 pages.
Final Office Action, dated Oct. 13, 2016, regarding U.S. Appl. No. 14/467,706, 28 pages.
Office Action, dated Jul. 27, 2016, regarding U.S. Appl. No. 13/785,616 , 59 pages.
Notice of Allowance, dated Jun. 24, 2016, regarding U.S. Appl. No. 13/835,262 , 19 pages.
Office Action, dated Jul. 8, 2016 regarding U.S. Appl. No. 14/467,706, 94 pages.
Notice of Allowance, dated Sep. 7, 2017, regarding U.S. Appl. No. 13/785,616, 28 pages.
Final Office Action, dated Jul. 19, 2017, regarding U.S. Appl. No. 13/922,411, 23 pages.
Notice of Allowance, dated Sep. 13, 2017, regarding U.S. Appl. No. 13/890,347, 22 pages.
Office Action, dated Jan. 15, 2015, regarding U.S. Appl. No. 13/861,678, 37 pages.
Slack et al., "Non-Conformance Mapping and Visualization," U.S. Appl. No. 15/056,536, filed Feb. 29, 2016, 43 pages.
Office Action, dated Jan. 15, 2016, regarding U.S. Appl. No. 13/798,964, 36 pages.
Final Office Action, dated Jan. 25, 2016, regarding U.S. Appl. No. 13/780,109, 54 pages.
Final Office Action, dated Feb. 9, 2016, regarding U.S. Appl. No. 13/835,262, 32 pages.
Final Office Action, dated Oct. 26, 2017, regarding U.S. Appl. No. 15/056,536, 30 pages.
European Patent Office Examination Report, dated Oct. 14, 2016 regarding Application No. 14160787.9, 6 pages.
Final Office Action, dated Dec. 2, 2015, U.S. Appl. No. 13/785,616, 38 pages.
Roh et al., "An object-based 3D walk-through model for interior construction progress monitoring", May 3, 2010, Elsevier, Automation in construction 20, pp. 66-75.
Prazak et al., "Visualization of an Object Using a Visual Query System," U.S. Appl. No. 15/003,802, filed Jan. 22, 2016, 49 pages.
European Patent Office Communcation, dated Sep. 15, 2015, regarding Application No. 14157597.7, 7 pages.
Notices of Reasons for Rejection and English Translation, dated Sep. 8, 2015, regarding Japanese Patent Application No. 2014-060864, 5 pages.
Kokogawa et al., "Wide-Area Contents Distribution based on Cooperation among Digital Libraries," Information Processing Academic Society Research Report, Mar. 10, 2000, vol. 2000, No. 26, pp. 83-88.
Australian Government Patent Examination Report No. 1, dated May 13, 2015, regarding Application No. 2014200304, 4 pages.
Australian Government Patent Examination Report No. 2, dated Oct. 29, 2015, regarding Application No. 2014200304, 4 pages.
Canadian Intellectual Property Office Examination Search Report, dated Feb. 17, 2015, regarding Application No. 2,839,914, 6 pages.
Canadian Intellectual Property Office Examination Search Report, dated Oct. 28, 2015, regarding Application No. 2,839,914, 5 pages.
Extended European Search Report, dated Nov. 18, 2015, regarding Application No. EP14159752.6, 6 pages.
Notice of Allowance, dated Nov. 6, 2015, regarding U.S. Appl. No. 13/855,102, 20 pages.
International Search Report and Written Opinion, dated Apr. 25, 2014, regarding Application No. PCT/US2014/010912, 10 pages.
International Preliminary Report on Patentability, dated Sep. 1, 2015, regarding Application No. PCT/US2014/010912, 6 pages.
Extended European Search Report, dated Jun. 2, 2014, regarding Application No. 14160787.9, 6 pages.

(56) References Cited

OTHER PUBLICATIONS

"Notice from the European Patent Office dated Oct. 1, 2007 concerning business methods," Official Journal EPO, Nov. 2007, pp. 592-593.
Extended European Search Report, dated Jul. 17, 2014, regarding Application No. 14162481.7, 5 pages.
Extended European Search Report, dated Jul. 23, 2014, regarding Application No. 14157597.7, 7 pages.
Extended European Search Report, dated Aug. 22, 2014, regarding Application No. EP14159832.6, 9 pages.
Extended European Search Report, dated Sep. 30, 2014, regarding Application No. EP14159760.9, 6 pages.
International Search Report and Written Opinion, dated Nov. 19, 2014, regarding Application No. PCT/US2014/011196, 10 pages.
International Search Report and Written Opinion, dated Dec. 1, 2014, regarding Application No. PCT/US2014/031030, 9 pages.
Extended European Search Report, dated Dec. 3, 2014, regarding Application No. 1470988.1, 7 pages.
Australian Government Patent Examination Report No. 1, dated Mar. 18, 2015, regarding Application No. 2014200514, 4 pages.
Final Office Action, dated Jul. 31, 2015, regarding U.S. Appl. No. 13/922,411, 23 pages.
Australian Government Patent Examination Report No. 2, dated Jul. 8, 2015, regarding Application No. 2014200514, 3 pages.
Australian Government Patent Examination Report No. 3, dated Aug. 13, 2015, regarding Application No. 2014200514, 4 pages.
Canadian Intellectual Property Office Examination Search Report, dated Mar. 24, 2015, regarding Application No. 2,840,798, 6 pages.
Australian Government Patent Examination Report No. 1, dated Mar. 27, 2015, regarding Application No. 2014200292, 3 pages.
Australian Government Patent Examination Report No. 2, dated Jul. 30, 2015, regarding Application No. 2014200292, 5 pages.
Canadian Intellectual Property Office Examination Search Report, dated Apr. 15, 2015, regarding Application No. 2,839,913, 4 pages.
Non-Patent Literature including images from the website www.aso.com, as published on Jan. 16, 2013 based on captures in the Internet Archive tool referred to as the WayBackMachine, http://web.archive.org/web/20130116040904/http://www.aso.com/ ("NPL1"), as Final Office Action dated Mar. 27, 2015, 3 pages.
"Marianna Airmotive Uses a FARO Laser Tracker to Reduce Repair Turnaround Time dramatically," Mar. 7, 2015, 2 pages. http://www.mariannaairmotive.com.
"What's New in SolidWorks," SolidWorks, Version 2010, 199 pages.http://files.solidworks.com/Supportfiles/Whats_new/2010/English/whatsnew.pdf.
Office Action, dated Dec. 17, 2014, regarding U.S. Appl. No. 13/780,109, 37 pages.
Final Office Action, dated Mar. 27, 2015, regarding U.S. Appl. No. 13/780,109, 18 pages.
Office Action, dated Sep. 17, 2015, regarding U.S. Appl. No. 13/780,109, 47 pages.
Office Action, dated Jul. 24, 2015, regarding U.S. Appl. No. 13/785,616, 55 pages.
Office Action, dated Feb. 26, 2015, regarding U.S. Appl. No. 13/858,364, 32 pages.
Notice of Allowance, dated Apr. 13, 2015, regarding U.S. Appl. No. 13/858,364, 5 pages.
Office Action, dated Feb. 27, 2015, regarding U.S. Appl. No. 13/834,893, 41 pages.
Notice of Allowance, dated Jun. 22, 2015, regarding U.S. Appl. No. 13/834,893, 24 pages.
Office Action, dated Mar. 4, 2015, regarding U.S. Appl. No. 13/855,102, 28 pages.
Final Office Action, dated Jun. 26, 2015, regarding U.S. Appl. No. 13/855,102, 18 pages.
Office Action, dated Apr. 23, 2015, regarding U.S. Appl. No. 13/798,964, 39 pages.
Office Action, dated Sep. 21, 2015, regarding U.S. Appl. No. 13/835,262, 41 pages.
Office Action, dated Aug. 14, 2015, regarding U.S. Appl. No. 13/890,347, 44 pages.
Office Action, dated May 5, 2015, regarding U.S. Appl. No. 13/861,678, 48 pages.
Final Office Action, dated Sep. 4, 2015, regarding U.S. Appl. No. 13/861,678, 27 pages.
Office Action, dated May 6, 2015, regarding U.S. Appl. No. 13/852,063, 39 pages.
Final Office Action, dated Oct. 22, 2015, regarding U.S. Appl. No. 13/852,063, 30 pages.
Office Action, dated Sep. 29, 2015, regarding U.S. Appl. No. 13/860,126, 34 pages.
Office Action, dated Jun. 29, 2015, regarding U.S. Appl. No. 13/922,411, 43 pages.
European Patent Office Examination Report, dated Jun. 28, 2017, regarding Application No. 14702979.7, 7 pages.
State Intellectual Property Office of China, Notification of First Office action, dated Nov. 3, 2017, regarding Application No. 2014102817178, 2 pages.
Japanese Notice of Reasons for Rejection and English translation, dated Jan. 9, 2018, regarding Application No. 2015560178, 8 pages.
Japanese Notice of Reasons for Rejection and English translation, dated Apr. 10, 2018, regarding Application No. 2014081733, 6 pages.
Japanese Notice of Reasons for Rejection, dated Apr. 16, 2018, regarding Application No. 2016541961, 8 pages.
European Office Action, dated May 31, 2018, regarding Application No. 14160787.9, 10 pages.
Office Action, dated Jun. 22, 2018, regarding U.S. Appl. No. 14/267,706, 33 pages.
Office Action, dated Mar. 23, 2017, regarding U.S. Appl. No. 13/785,616, 35 pages.
Notice of Allowance, dated May 1, 2017, regarding U.S. Appl. No. 13/890,347, 25 pages.
Final Office Action, dated Apr. 20, 2017, regarding U.S. Appl. No. 13/861,678, 23 pages.
Office Action, dated Mar. 31, 2017, regarding U.S. Appl. No. 13/922,411, 31 pages.
Office Action, dated Apr. 18, 2017, regarding U.S. Appl. No. 15/056,536, 76 pages.
China National Intellectual Property Administration Notification of First Office Action with English Translation, dated Nov. 23, 2018, regarding Application No. 201510524813.5, 20 pages.
Final Office Action, dated Dec. 18, 2018, regarding U.S. Appl. No. 14/467,706, 24 pages.
Notice of Allowance, dated Apr. 24, 2019, regarding U.S. Appl. No. 14/467,706, 14 pages.
European Patent Office Extended Search Report, dated Feb. 14, 2019, regarding Application No. 18205193.8, 7 pages.
The State Intellectual Property Office of the P.R.C. First Office Action and Search Report with English Translation, dated Apr. 2, 2019, regarding Application No. 2014101448284, 14 pages.

* cited by examiner

VISUALIZATION OF AN OBJECT USING A VISUAL QUERY SYSTEM

This application is a continuation of U.S. patent application Ser. No. 13/852,063, filed Mar. 28, 2013, which is incorporated by reference herein in its entirety.

BACKGROUND INFORMATION

1. Field

The present disclosure relates generally to visualization systems and, in particular, to querying information using visualization systems. Still more particularly, the present disclosure relates to a method and apparatus for allowing a user to visually query information about an object using a visualization system.

2. Background

A visualization system, as used herein, may be a system that allows a user to view an object and/or data about the object. For example, a visualization system may visually present portions and/or individual components of one or more three-dimensional models of an object within a graphical user interface. Visualization systems may be used to perform various operations with respect to the object. For example, a user may use a visualization system to visualize a particular part or assembly of parts within the object to identify information for use in performing an inspection. However, some currently available visualization systems may be more difficult to use and navigate than desired.

As one illustrative example, a visualization system may be used to visualize the different types of aircraft being manufactured at a facility and the data about these aircraft. Each aircraft may be comprised of thousands, hundreds of thousands, or millions of parts. With some currently available visualization systems, filtering the extensive amount of data available down to the data of interest to a user on any given day may be more difficult and time-consuming than desired.

Further, some users may not have the knowledge, experience, and/or training needed to use these types of currently available visualization systems. For example, a user may want to use the visualization system to identify a particular instance of a fastener element located within a specific portion of an aircraft such that a replacement part may be ordered. This type of fastener element may be used in hundreds of instances within the aircraft. However, the user may be unable to quickly and efficiently filter through the hundreds of instances of the fastener element to identify the particular instance of the fastener element located within the specific portion of the aircraft of interest. Therefore, it would be desirable to have a method and apparatus that take into account at least some of the issues discussed above, as well as other possible issues.

SUMMARY

In one illustrative embodiment, a computer-implemented method for visualizing data about an object is provided. The method comprises using a processor to perform the method steps. A hierarchy of image blocks are generated using an action scheme and a part. Instructions identifying a hierarchy of image blocks and the action scheme are generated. The hierarchy of image blocks are communicated to a graphical user interface. An image area is identified in an image block in the hierarchy of image blocks in the graphical user interface. The image area identifies a spatial region within the object. A search window is generated having a type menu that indicates a type of search to perform. The type of search is further generated from one of a location within the spatial region within the object or a part number for the part. A query is generated to identify a location of the part within the object. The query is based on the type of search, the spatial region, and the action scheme. An indicator representing the location of the part identified by the query is displayed.

In another illustrative embodiment, an apparatus comprises a visual query system. The visual query system comprises a processor. The visual query system is configured to generate a hierarchy of image blocks are generated using an action scheme and a part. Instructions identifying a hierarchy of image blocks and an action scheme are generated. The hierarchy of image blocks is communicated to a graphical user interface. An image area is identified in an image block in the hierarchy of image blocks in the graphical user interface. The image area identifies a spatial region within the object. A search window is generated having a type menu that indicates a type of search to perform. The type of search is further generated from one of a location within the spatial region within the object or a part number for the part. A query is generated to identify a location of the part within the object. The query is based on the type of search, the spatial region, and the action scheme. An indicator representing the location of the part identified by the query is displayed.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a system that allows a user to search for information using a visualization system without requiring an extensive knowledge of how the visualization system works and/or how to filter through information using the visualization system. In particular, the illustrative embodiments recognize and take into account that it may be desirable to have a system that allows a user to visually query for information within the visualization system with a desired level of ease. Thus, the illustrative embodiments provide a visual query system configured to visually query for information within a visualization system.

Figure 1:
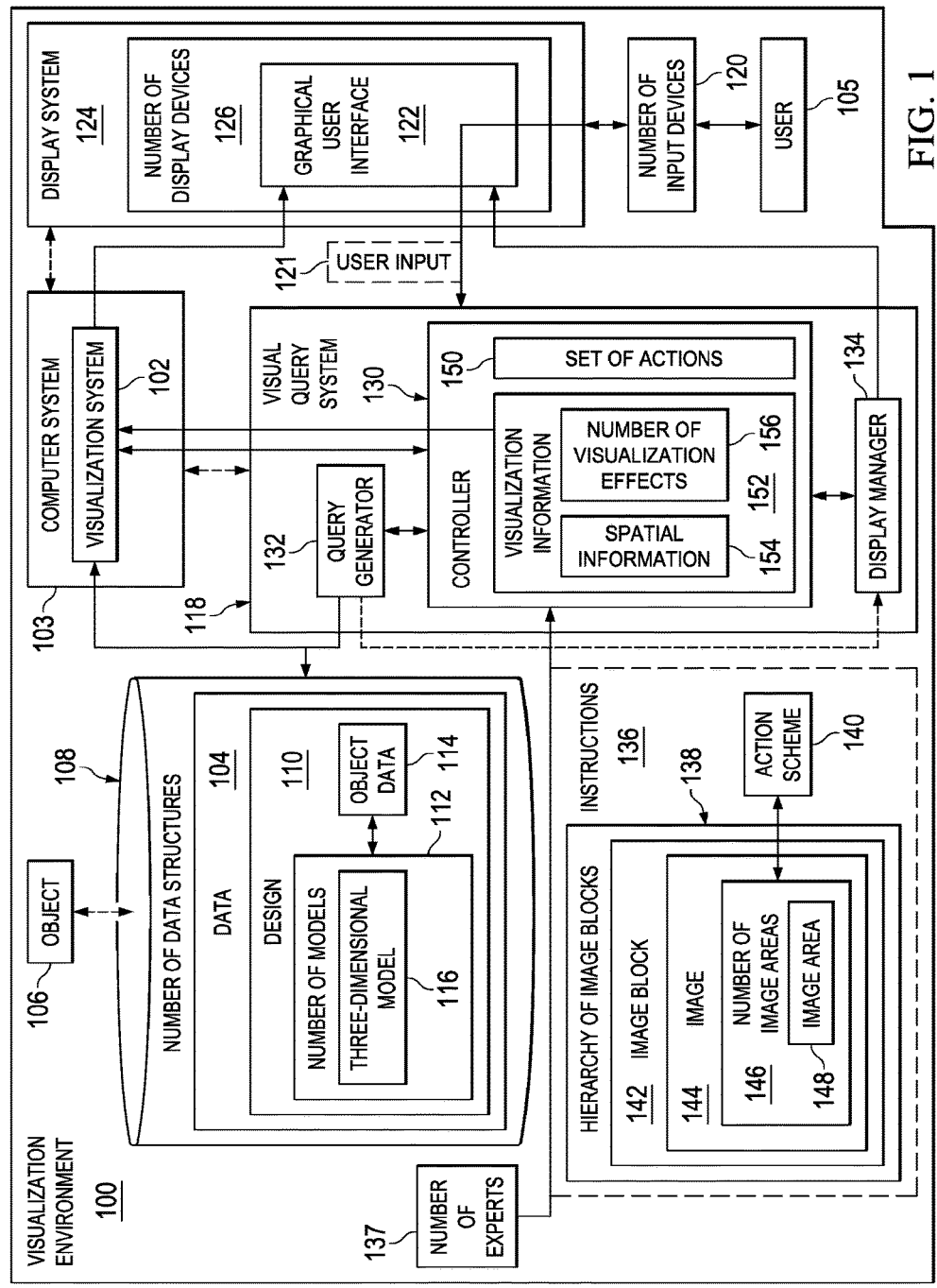
FIG. 1 is an illustration of a visualization environment in the form of a block diagram in accordance with an illustrative embodiment.

Referring now to the figures and, in particular, with reference to FIG. 1, an illustration of a visualization environment is depicted in the form of a block diagram in accordance with an illustrative embodiment. In this illustrative example, visualization environment 100 includes visualization system 102.

As depicted, visualization system 102 may be implemented using hardware, software, or a combination of the two. For example, visualization system 102 may be implemented within computer system 103. Computer system 103 may be comprised of one or more computers, depending on the implementation. When more than one computer is present in computer system 103, these computers may be in communication with each other.

In this illustrative example, visualization system 102 may be used by user 105 to visualize data 104 about object 106. As used herein, user 105 may "visualize" data 104 about object 106 by viewing some type of graphical representation of at least some portion of data 104 about object 106.

Object 106 may take a number of different forms. Object 106 may be, for example, without limitation, an aerial vehicle, a ground vehicle, a water vehicle, a space vehicle, a manufacturing facility, a building, a power grid, an electrical system, a mechanical system, a computer, a neighborhood, a city, or some other type of object. Object 106 may be any object that may be logically broken down into multiple components. In some cases, object 106 may be comprised of components, assemblies of components, and sub-assemblies of components.

Data 104 about object 106 may be stored in number of data structures 108. As used herein, a "number of" items may be one or more items. In this manner, number of data structures 108 may be one or more data structures. A data structure in number of data structures 108 may take the form of, for example, but is not limited to, a database, a geometric representation or model of object 106, or some other type of data structure or combination of data structures.

In one illustrative example, number of data structures 108 may be stored within computer system 103. In some cases, number of data structures 108 may be stored within visualization system 102. In other cases, number of data structures 108 may be stored within computer system 103 separate from visualization system 102. In still other illustrative examples, number of data structures 108 may be stored on any number of servers, memory devices, computer systems, and/or other types of storage devices.

Data 104 about object 106 may take a number of different forms. In one illustrative example, data 104 may include design 110 for object 106. Design 110 may include, for example, without limitation, number of models 112, object data 114, and/or other types of data.

Number of models 112 may include, for example, without limitation, one or more three-dimensional models of object 106, portions of object 106, and/or components that make up object 106. Three-dimensional model 116 may be an example of one of number of models 112. Three-dimensional model 116 may be, for example, without limitation, a computer-aided design (CAD) model.

Object data 114 may include different types of data about object 106, portions of object 106, and/or components that make up object 106. Object data 114 may include, for example, without limitation, at least one of design data, engineering data, geometry data, attribute data, part data, manufacturing data, production data, maintenance data, work order data, or some other type of data for object 106.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, visualization system 102 may be configured to visually present data 104 to user 105 through graphical user interface 122 displayed on display system 124. Display system 124 may be comprised of number of display devices 126. A display device in number of display devices 126 may take a number of different forms. For example, the display device may take the form of, but is not limited to, a monitor, a screen, a liquid crystal display (LCD), a touch screen, a head-mounted display device, a virtual reality display device, a holographic display device, or some other type of display device.

In some illustrative examples, display system 124 may be partially or fully implemented as part of computer system 103. In other illustrative examples, display system 124 may be considered completely independent of computer system 103.

User 105 may interact with graphical user interface 122 using number of input devices 120. In particular, user 105 may enter user input 121 into graphical user interface 122 through number of input devices 120. Number of input devices 120 may include, for example, without limitation, a keyboard, a mouse, a stylus, a glove, a remote, a touch screen, a multi-touch screen, a virtual keyboard, or some other type of input device.

In some illustrative examples, one or more of number of input devices 120 may be considered part of display system 124. For example, a display device in number of display devices 126 and an input device in number of input devices 120 may be implemented within the same device. As a specific example, a touch screen display device may be used as both a display device and an input device.

In this illustrative example, user 105 may use visual query system 118 to quickly and efficiently visualize desired portions of data 104 about object 106. In one illustrative example, visual query system 118 may be considered part of visualization system 102. In another illustrative example, visual query system 118 may be considered separate from visualization system 102.

Further, visual query system 118 may be implemented using hardware, software, or a combination of the two. In one illustrative example, visual query system 118 may be implemented within computer system 103. However, in another illustrative example, visual query system 118 may be implemented within a different computer system or some other type of processing unit separate from computer system 103.

With visual query system 118, user 105 may be able to more quickly and efficiently visualize portions of data 104 of interest to user 105 without needing to know how to fully navigate and use visualization system 102. Further, user 105 may be able to use visual query system 118 to affect the manner in which visualization system 102 displays the portion of data 104 of interest about object 106 to user 105.

User 105 may interact with visual query system 118 using graphical user interface 122 and number of input devices 120. As one illustrative example, when using visualization system 102, user 105 may be able to open a new window in graphical user interface 122 that allows user 105 to access visual query system 118.

As depicted, visual query system 118 may include controller 130, query generator 132, and display manager 134. Controller 130 may be configured to receive instructions 136. In one illustrative example, instructions 136 may be generated by number of experts 137.

As used herein, an "expert," such as one of number of experts 137, may be any person having a certain level of knowledge about object 106 and data 104 about object 106. This knowledge may have been acquired through education, experience over time, training, the practicing of a certain skill set, and/or in some other manner. In some cases, an expert in number of experts 137 may be referred to as a subject matter expert (SME).

In this illustrative example, instructions 136 may be generated for indicating the actions that are to be performed in response to receiving user input 121 through graphical user interface 122. These actions may include changing what is displayed within graphical user interface 122, affecting the manner in which visualization system 102 displays data 104 about object 106, and/or other types of actions.

Instructions 136 may be generated by number of experts 137 based on an anticipation of the needs of user 105 and/or a group of users similar to user 105. For example, instructions 136 may be generated based on knowledge and/or predictions of how and why a group of users, which includes user 105, intend to use visualization system 102.

The group of users may be, for example, without limitation, a group of engineers, a group of mechanics, a group of technicians, a group of inventory specialists, a group of designers, a group of project managers, or some other type of group. Further, different instructions may be generated for different types of groups of users. In this manner, each group of users may be able to use a customized version of visual query system 118.

In this illustrative example, instructions 136 may identify hierarchy of image blocks 138 and action scheme 140. Hierarchy of image blocks 138 may include one or more levels of hierarchy. In some cases, this hierarchy may be organized in the form of a tree structure. In some cases, the hierarchy may be comprised of multiple tree structures stemming from the same root image block. When multiple tree structures are present in hierarchy of image blocks 138, multiple bottommost levels, each comprising one or more image blocks, may be present within hierarchy of image blocks 138. However, only one image block may be present at the root level of hierarchy of image blocks 138. The multiple structures may be independent of each other except for the root level or may be intertwined, depending on the implementation.

Image block 142 may be an example of one of the image blocks in hierarchy of image blocks 138. Image block 142 may be a logical block comprised of image 144 and number of image areas 146. In some cases, image 144 may be an image of object 106 generated using one of number of models 112 of object 106. However, in other examples, image 144 may be some other type of image. Further, image 144 may be a single image or a collection of multiple images, depending on the implementation.

When image block 142 is the root image block in hierarchy of image blocks 138, image 144 may be referred to as a root image, or in some cases, an index image or a base image. This root image may be the initial image displayed to user 105 when user 105 begins using visual query system 118. In particular, this root image may be visually presented to user 105 within graphical user interface 122 by display manager 134.

Each of number of image areas 146 may be selectable by user 105 through user input 121. Each of number of image areas 146 may be a portion of image 144. In this illustrative example, no two image areas may share any portion of image 144. In other words, no two image areas may overlap. An image area in number of image areas 146 may also be referred to as a "hotspot" or a "selectable area," depending on the implementation.

Action scheme 140 may identify the one or more actions that are to be performed by visual query system 118 in response to the selection of the different image areas in number of image areas 146 by user input 121. For example, controller 130 may receive user input 121 selecting image area 148 from number of image areas 146 through graphical user interface 122. User input 121 selecting image area 148 may be, for example, but is not limited to, a mouse click anywhere within image area 148.

In response to receiving this selection of image area 148, controller 130 may identify set of actions 150 to be performed by visual query system 118 based on action scheme 140 within instructions 136. Set of actions 150 may include loading a new image block in the next level of hierarchy of image blocks 138 and displaying the corresponding image within graphical user interface 122, generating visualization information 152 to be sent to visualization system 102, and/or some other number of actions.

Each image area in number of image areas 146 may be a branching image area or a final image area. In some illustrative examples, all of the image areas in number of image areas 146 may be branching image areas or final image areas. In other illustrative examples, a portion of number of image areas 146 may be branching image areas, while another portion of number of image areas 146 may be final image areas.

When image area 148 is a branching image area, the selection of image area 148 may cause a new image block from the level in hierarchy of image blocks 138 immediately below image block 142 to be loaded. In other words, image area 148 may allow branching to a new image block. Further, the image corresponding to the new image block may be displayed within graphical user interface 122. The new image displayed may be an image having a finer level of detail, may be a zoomed-in image of image 144, or some other type of image. User 105 may then further select any one of the number of image areas defined for this image.

When image area 148 is a final image area, a selection of image area 148 may lead to visualization information 152 being generated. Visualization information 152 may be generated for use by visualization system 102. In some cases, visualization system 102 may use visualization information 152 to determine which portion of data 104 to display within graphical user interface 122. Further, visualization system 102 may use visualization information 152 to determine how to display this portion of data 104.

Visualization information 152 may include, for example, without limitation, spatial information 154, number of visualization effects 156, and/or other types of information. In some cases, a portion of visualization information 152 may be generated based on the results of a query run by query generator 132. For example, one of set of actions 150 may include running a query based on the selection of image area 148. The query may filter data 104 to identify the portion of data 104 of interest to user 105 based on the selection of image area 148. The parameters of the query may be defined by instructions 136.

Spatial information 154 may include information about the manner in which this filtered data is to be displayed. For example, spatial information 154 may identify a spatial region within object 106 with respect to which the filtered data is to be graphically represented. For example, visualization system 102 may use spatial information 154 to graphically represent the portion of data 104 relevant to the spatial region identified in spatial information 154 within graphical user interface 122. In some cases, spatial information 154 may also identify the viewpoint from which the data is to be graphically represented.

Number of visualization effects 156 may identify a number of visual effects to be applied to the graphical representation of data 104 displayed to user 105 by visualization system 102. Number of visualization effects 156 may include, for example, without limitation, any number of coloring effects, bolding effects, outlining effects, cropping effects, zoom effects, clipping effects, and/or other types of effects.

In this manner, user 105 may navigate through hierarchy of image blocks 138 until user 105 selects an image area that results in visualization information 152 being sent to visualization system 102. By navigating through hierarchy of image blocks 138 in this manner, user 105 may quickly "visually query" the portion of data 104 of interest to user 105. This process of visually querying data 104 may be simpler than using visualization system 102 to identify the data of interest.

Visualization system 102 and visual query system 118 may be used to visualize any number of objects in addition to or in place of object 106. In one illustrative example, visualization system 102 and visual query system 118 may together form an integrated visualizer. This integrated visualizer may also be referred to as an integrated visualization system.

The integrated visualizer may be used by different types of users. For example, instructions 136 generated for one type of user may be different from instructions 136 generated for another type of user. Controller 130 may be configured to receive different instruction sets and determine which instruction set to use based on the particular user.

Further, the integrated visualizer may allow user 105 and/or other users to visualize object data not just for object 106 but for each of a plurality of objects. These objects may be, for example, a plurality of vehicles, a plurality of aircraft, a plurality of ground vehicles, a plurality of ships, a plurality of engines, or a plurality of some other type of object.

The integrated visualizer may allow users to visually query for a portion of the object data corresponding to one of the plurality of objects based on a number of search criteria. The search criteria may include, for example, without limitation, at least one of a location with respect to a reference coordinate system for the plurality of objects, an object identifier, a part number, an instance number, or some other type of search criteria.

Additionally, the integrated visualizer may allow a user to visually query for a desired portion of the object data in substantially real-time. For example, the integrated visualizer may allow a user to filter real-time data and visualize data of interest in real-time.

The illustration of visualization environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
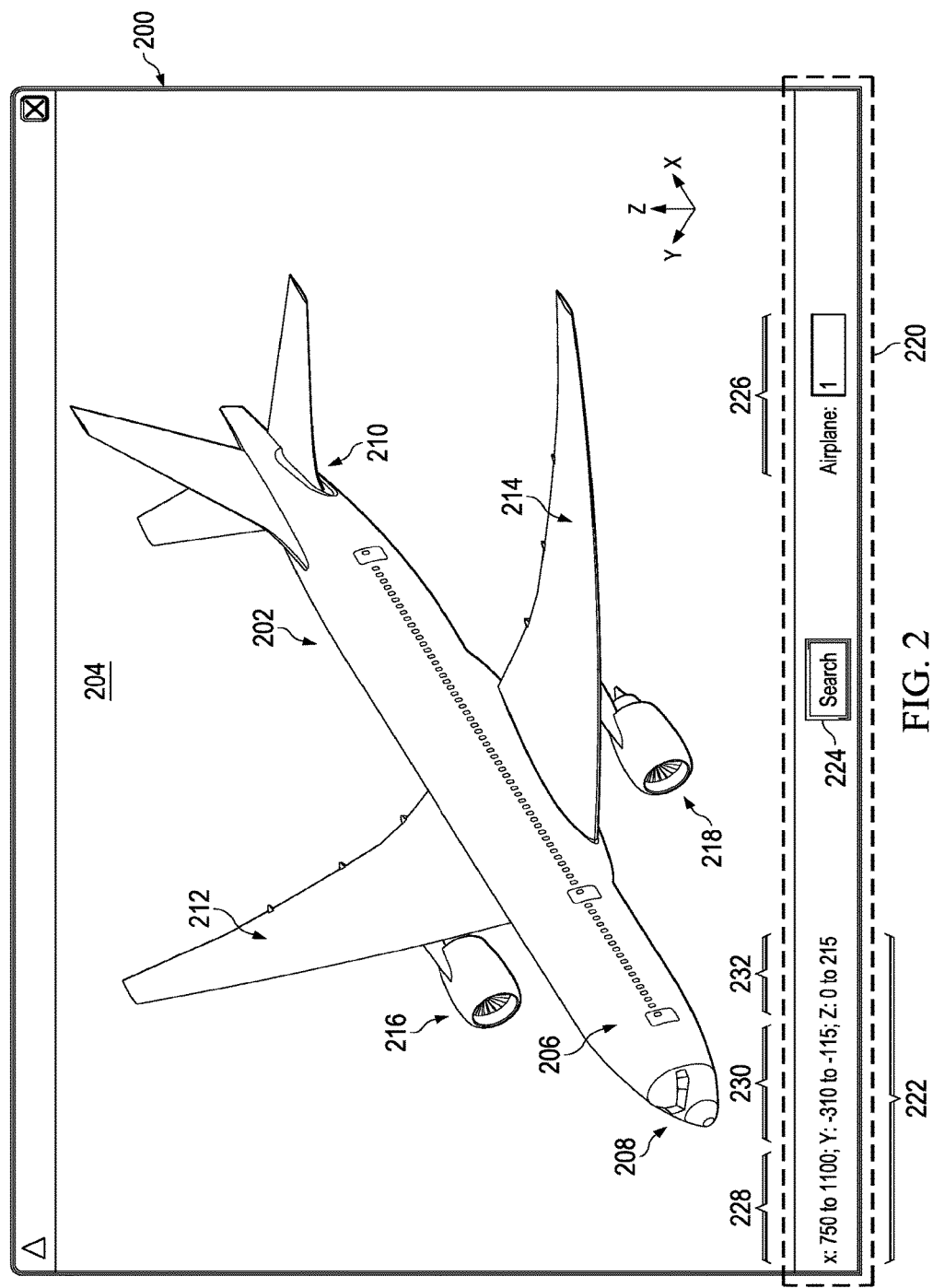
FIG. 2 is an illustration of a graphical user interface in accordance with an illustrative embodiment.

With reference now to FIG. 2, an illustration of a graphical user interface is depicted in accordance with an illustrative embodiment. Graphical user interface 200 in FIG. 2 is an example of one implementation for graphical user interface 122 in FIG. 1.

In this illustrative example, window 204 is displayed within graphical user interface 200. Aircraft image 202 is displayed within window 204. Aircraft image 202 is an example of one implementation for image 144 in FIG. 1. Aircraft image 202 may be a root image in this illustrative example. As depicted, aircraft image 202 is an image of an aircraft that has fuselage 206, nose section 208 and tail section 210. Wing 212 and wing 214 are attached to fuselage 206. Engine 216 and engine 218 are attached to wing 212 and wing 214, respectively.

Figure 3:
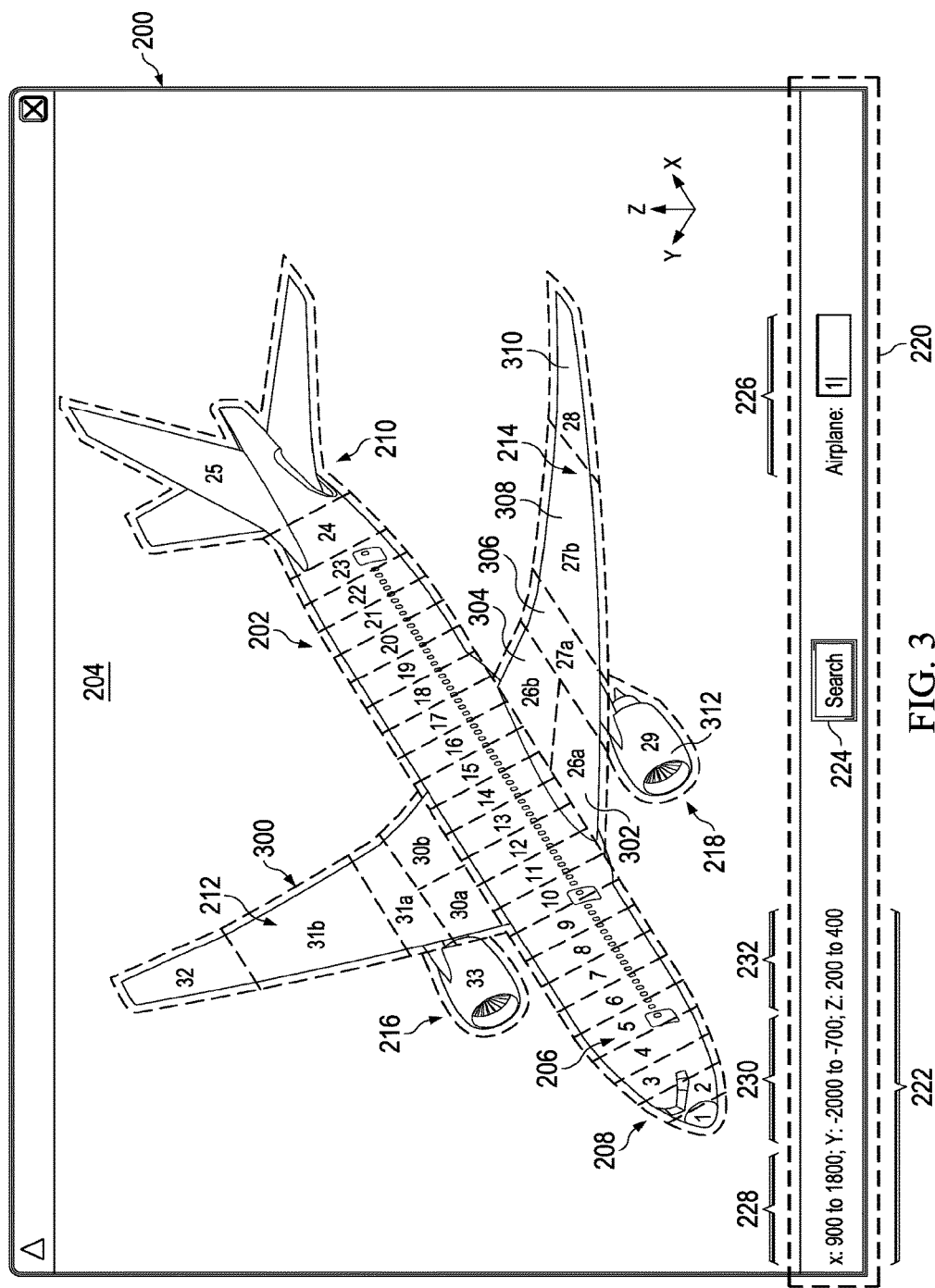
FIG. 3 is an illustration of a graphical user interface displaying a number of image areas in accordance with an illustrative embodiment.

Aircraft image 202 may be part of an image block, such as image block 142 in FIG. 1. A number of image areas, such as number of image areas 146 in FIG. 1, may correspond to aircraft image 202. However, these image areas are not shown in FIG. 2. These image areas are hidden in FIG. 2 but are shown in FIG. 3 below.

As depicted, graphical user interface 200 includes control section 220. Control section 220 includes image area data 222, search control 224, and object selection control 226. In this illustrative example, image area data 222 identifies coordinate boundaries for the particular image area on aircraft image 202 over which a cursor may be hovering. In this manner, a user may be provided some information about an image area without needing to see the image area or select the image area.

Image area data 222 includes x-coordinate range 228, y-coordinate range 230, and z-coordinate range 232. X-coordinate range 228 indicates the x-coordinate boundaries of the image area. Y-coordinate range 230 indicates the y-coordinate boundaries of the image area. Z-coordinate range 232 indicates the z-coordinate boundaries of the image area. These coordinates may be with respect to some reference coordinate system for the aircraft being represented by aircraft image 202.

In this illustrative example, search control 224 may be selected by a user to cause a new search window to be displayed. An example of this search window is described in FIG. 4 below. Object selection control 226 may allow a user to select which aircraft is represented by aircraft image 202. In some cases, a different aircraft image 202 may be displayed when a different aircraft is selected. However, in other cases, the selection of a different aircraft may change the image areas corresponding to aircraft image 202, change the data or source of data that is queried in response to the selection of image areas.

With reference now to FIG. 3, an illustration of graphical user interface 200 from FIG. 2 displaying a number of image areas is depicted in accordance with an illustrative embodiment. In this illustrative example, number of image areas 300 has been displayed over aircraft image 202. Each of number of image areas 300 may be selectable by a user.

Image areas 302, 304, 306, 308, 310, and 312 may be examples of image areas in number of image areas 300. Image areas 302, 304, 306, 308, and 310 represent various portions of wing 214 of aircraft image 202. A user may select any one of image areas 302, 304, 306, 308, and 310 to view a particular portion of wing 214 in greater detail. Image area 312 represents engine 218. A user may select image area 312 to view engine 218 in greater detail or to load a new image.

Figure 4:
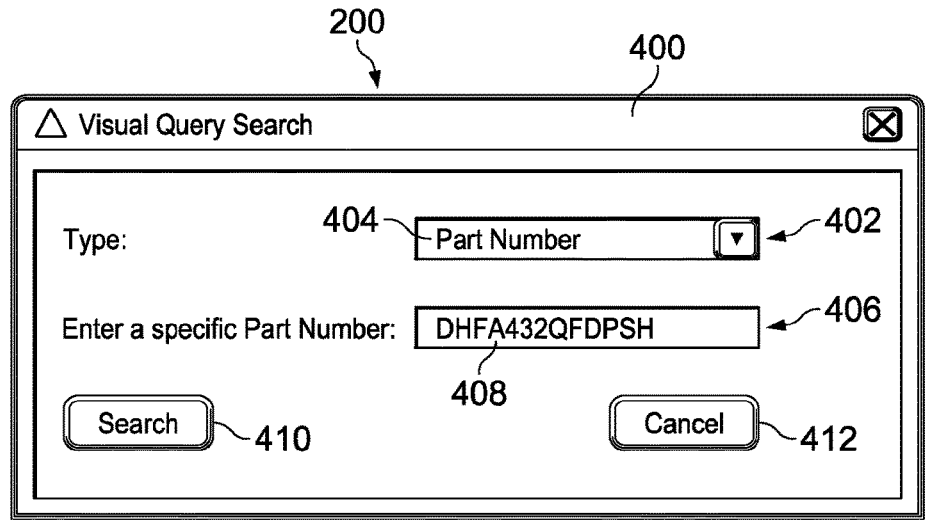
FIG. 4 is an illustration of a search window in accordance with an illustrative embodiment.

With reference now to FIG. 4, an illustration of a search window is depicted in accordance with an illustrative embodiment. In this illustrative example, search window 400 may be displayed within graphical user interface 200 in response to a user selecting search control 410 in FIG. 4.

As depicted, search window 400 may include type menu 402. Type menu 402 may allow the user to indicate the type of search to be performed. In this illustrative example, a user has selected part number 404 indicating that the user desires to search for a part by the part number. In response to the user selecting part number 404, specific part number field 406 is displayed. The user has entered specific part number 408 within specific part number field 406.

The user may select search control 410 to search for the part having specific part number 408. The user may select cancel control 412 to cancel this particular search.

Figure 5:
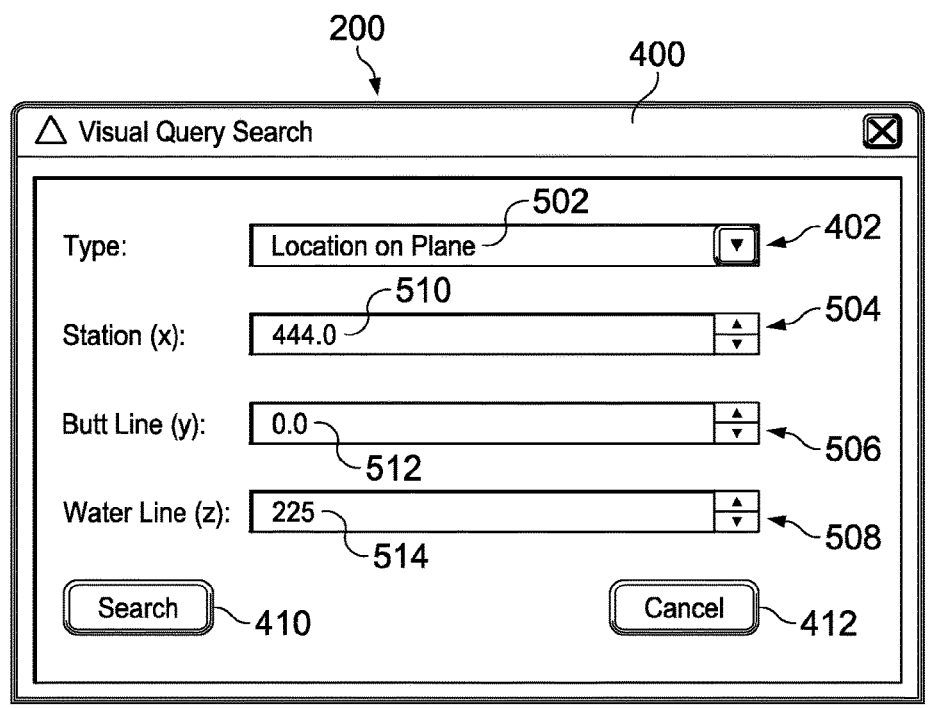
FIG. 5 is an illustration of a search window in accordance with an illustrative embodiment.

With reference now to FIG. 5, an illustration of search window 400 from FIG. 4 is depicted in accordance with an illustrative embodiment. In this illustrative example, the user has selected location on plane 502 for the type of search to be performed. In response to this selection, station 504, butt line 506, and water line 508 are displayed within search window 400.

Station 504, butt line 506, and water line 508 may be fields in which a user may enter values. A value for station 504 may represent an x-coordinate. A value for butt line 506 may represent a y-coordinate. A value for water line 508 may represent a z-coordinate. The user may select search control 410 to search for a location, defined by these x-y-z-coordinates, on the aircraft represented by aircraft image 202 in FIGS. 2-3.

Although search window 400 in FIG. 4 and FIG. 5 depict searches that can be performed by part number 404 or location on plane 502, other types of searches may also be performed. Of course, in some other illustrative examples, instances of a part may be searched using different types of search criteria. For example, a part may be searched for using both a part number and a location on the plane. As another example, a part may be searched for based on another part that is connected to the part.

Figure 6:
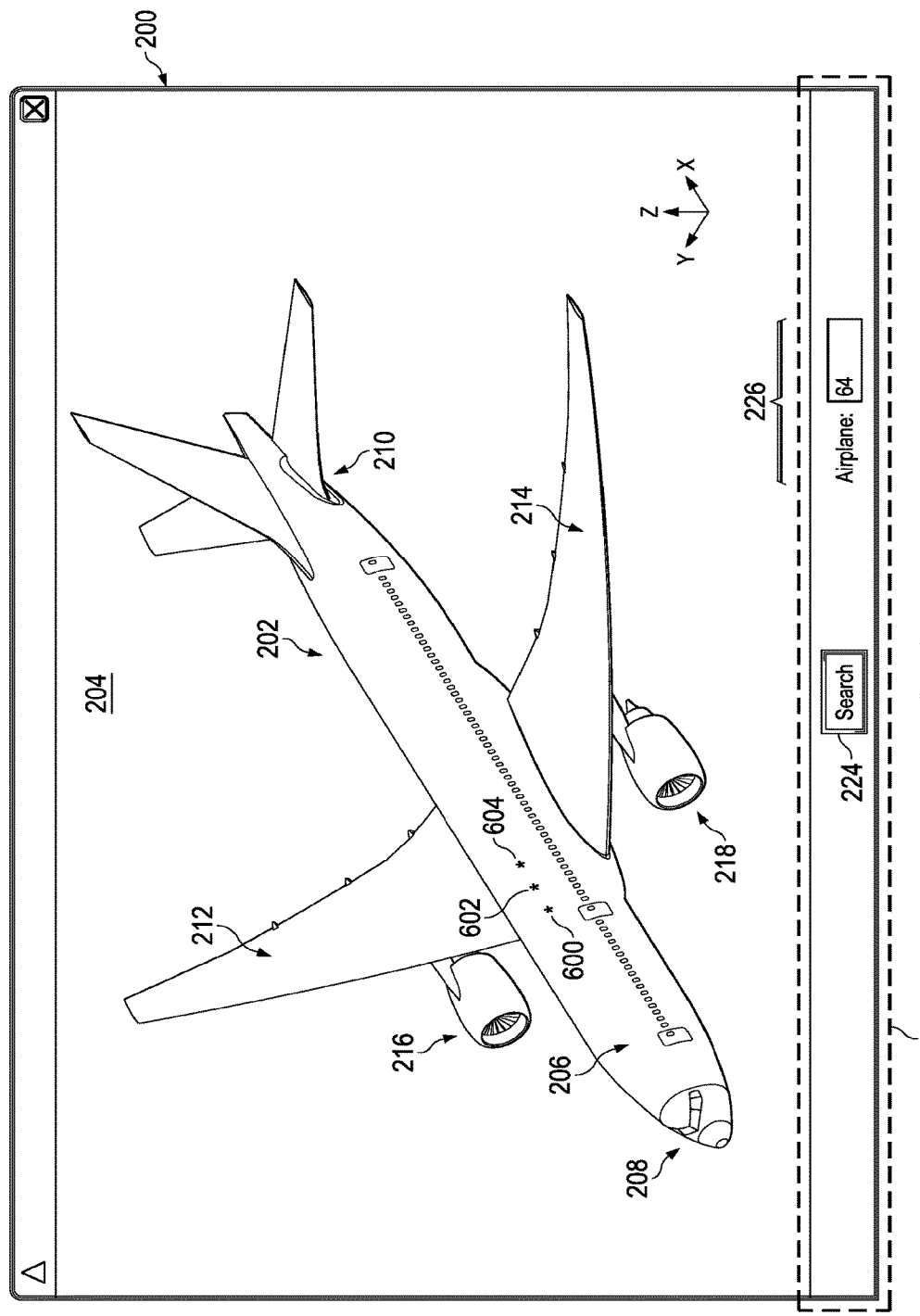
FIG. 6 is an illustration of a search result in accordance with an illustrative embodiment.

With reference now to FIG. 6, an illustration of a search result is depicted in accordance with an illustrative embodiment. In this illustrative example, the results of the search performed based on the criteria entered within search window 400 in FIG. 4 are displayed within window 204. The search results take the form of indicator 600, indicator 602, and indicator 604.

Each of these indicators represents an image area within which one or more instances of the part have been identified. In one illustrative example, the part may extend across the portion of the aircraft represented by the three image areas corresponding to indicator 600, indicator 602, and indicator 604.

A selection of one of these indicators by the user results in visualization information, such as visualization information 152 in FIG. 1, being generated. A visualization system may use this visualization information to display a graphical representation of data to the user. Of course, in other illustrative examples, some other action may be performed in response to the selection of one of the indicators.

Figure 7:
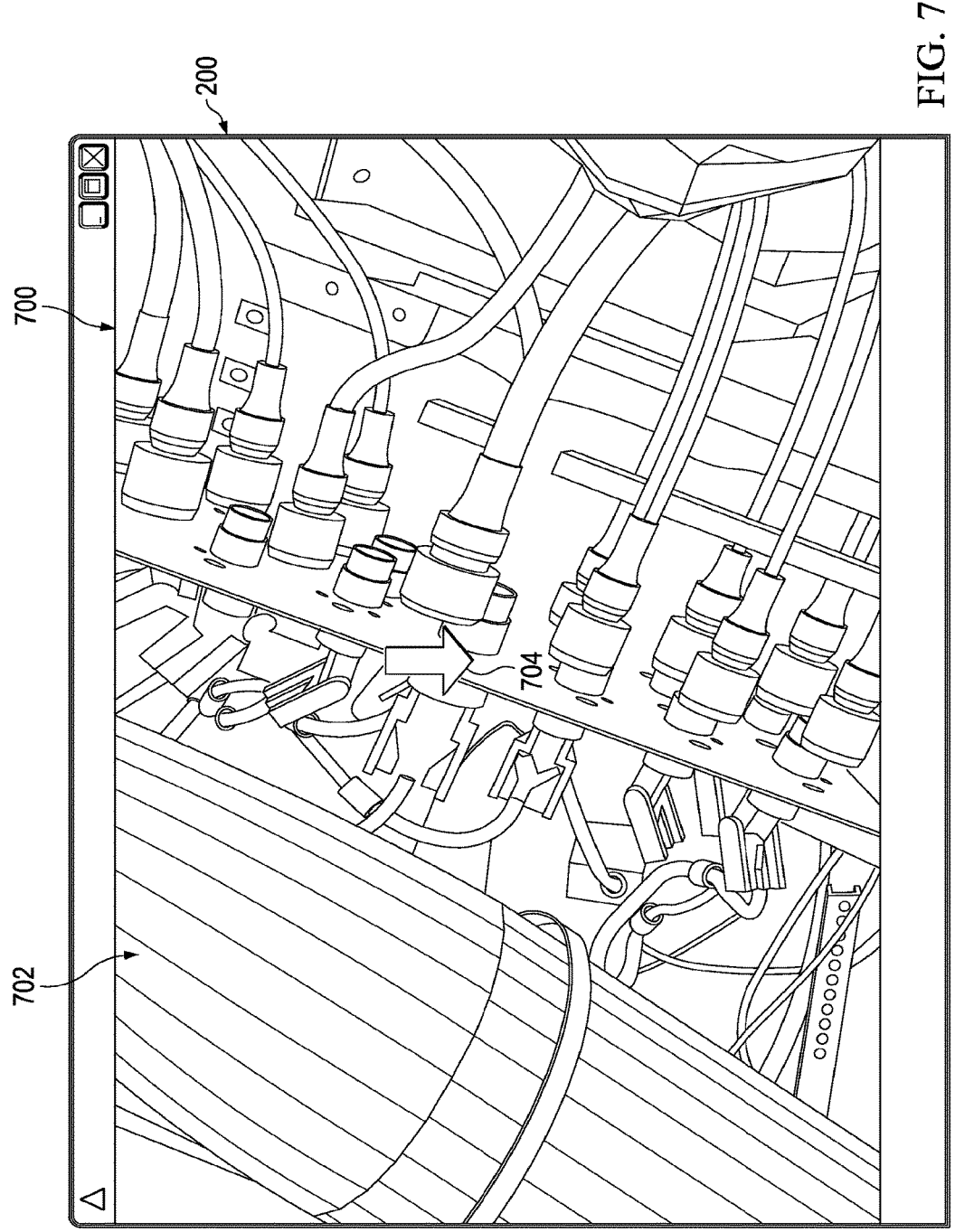
FIG. 7 is an illustration of a visualization of data for the aircraft displayed within a graphical user interface in accordance with an illustrative embodiment.

With reference now to FIG. 7, an illustration of a visualization of data for the aircraft represented by aircraft image 202 in FIG. 2 displayed within graphical user interface 200 is depicted in accordance with an illustrative embodiment. In this illustrative example, window 700 visually presents data about the aircraft represented by aircraft image 202 with respect to spatial region 702 within graphical user interface 200.

Indicator 704 points to a particular location at which an instance of the part having the particular part number identified by the user has been found. This indicator may remain visible within graphical user interface 200 even when the instance of the part is contained within some other part or hidden from view. In this illustrative example, indicator 704 may remain visible from any view angle, even when the user changes the viewpoint and/or portion of spatial region 702 being displayed.

Figure 8:
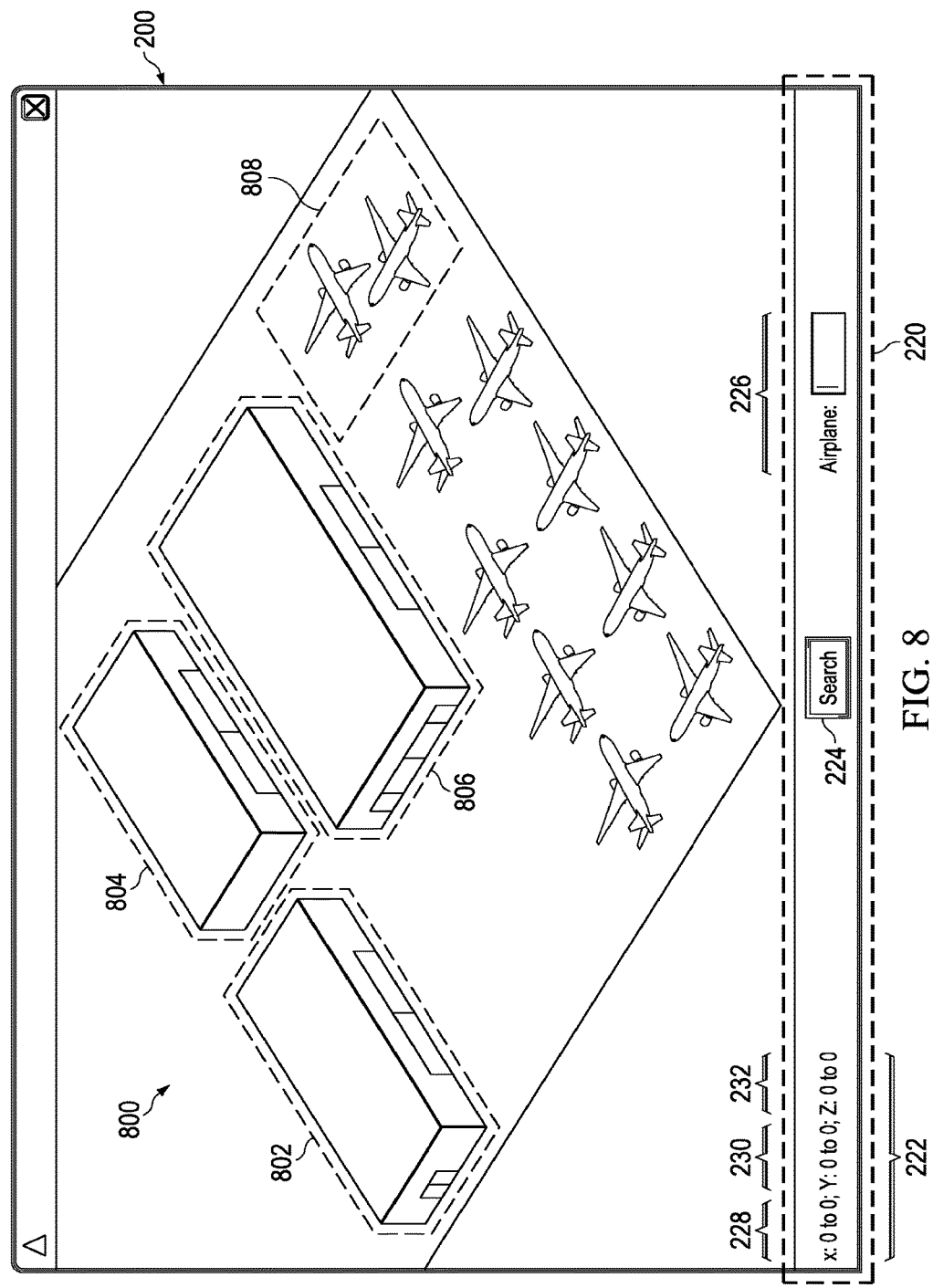
FIG. 8 is an illustration of a graphical user interface displaying a different image in accordance with an illustrative embodiment.

Turning now to FIG. 8, an illustration of graphical user interface 200 displaying a different image is depicted in accordance with an illustrative embodiment. In this illustrative example, manufacturing image 800 may be an image of a manufacturing facility within which aircraft are manufactured. Manufacturing image 800 may be a root image. Image areas 802, 804, 806, and 808 are displayed over manufacturing image 800. A user may select any one of these image areas to view a finer level of detail about the manufacturing facility.

Figure 9:
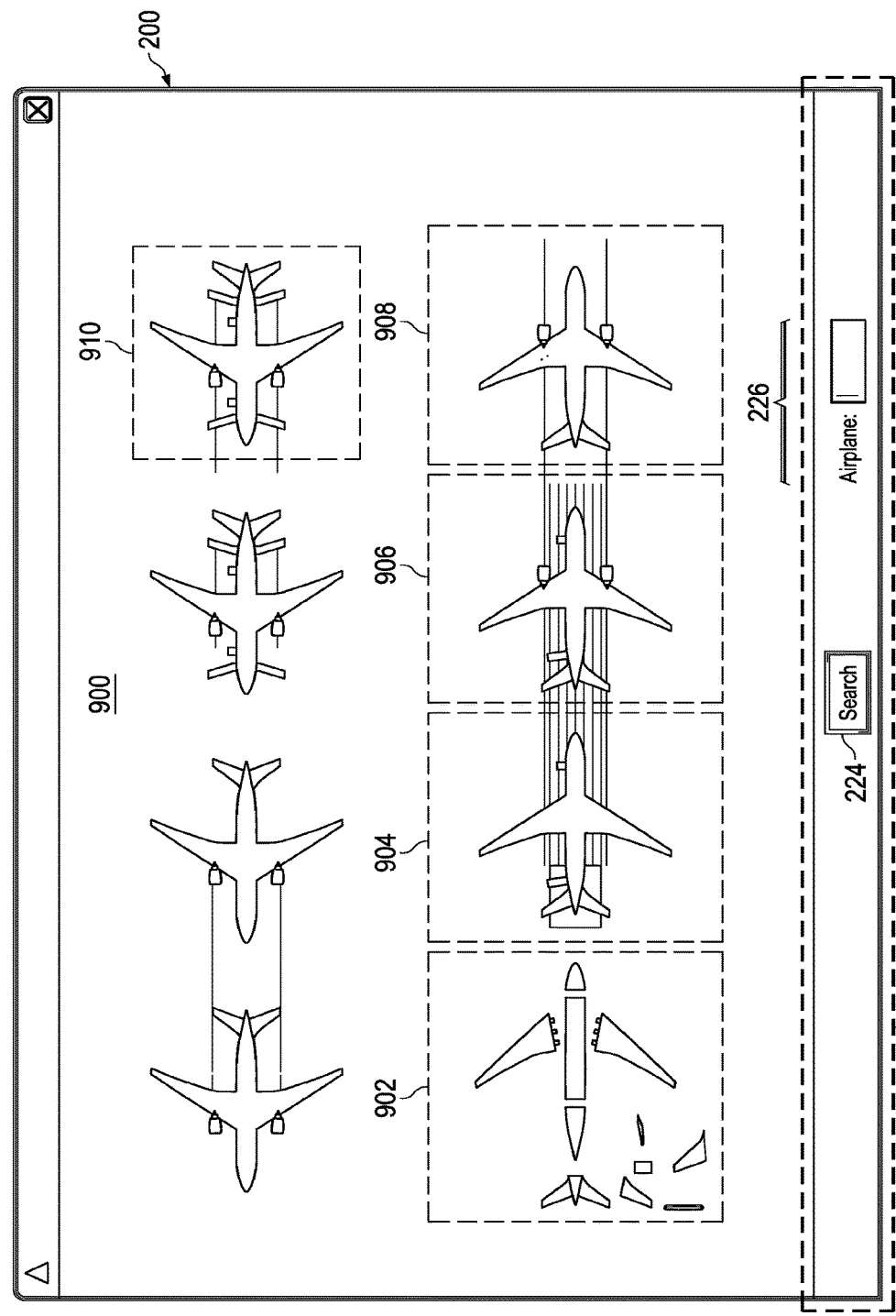
FIG. 9 is an illustration of another image displayed within a graphical user interface in accordance with an illustrative embodiment.

With reference now to FIG. 9, an illustration of another image displayed within graphical user interface 200 is depicted in accordance with an illustrative embodiment. In this illustrative example, image 900 may be displayed within graphical user interface 200 in response to the selection of image area 806 in FIG. 8.

Image areas 902, 904, 906, 908, and 910 represent different stages of aircraft assembly. In this illustrative example, a selection of any one of these image areas by a user may result in visualization information being generated and sent to a visualization system. When an earlier stage in the assembly is selected, the visualization system may visually present fewer components as compared to when a later stage in the assembly is selected.

The illustrations of graphical user interface 200 in FIGS. 2-10 are not meant to imply physical or architectural limitations to the manner in which an illustrative embodiment may be implemented. Other components in addition to or in place of the ones illustrated may be used. Some components may be optional.

The different components shown in FIGS. 2-10 may be illustrative examples of how components shown in block form in FIG. 1 can be physically implemented. Additionally, some of the components in FIGS. 2-10 may be combined with components in FIG. 1, used with components in FIG. 1, or a combination of the two.

Figure 10:
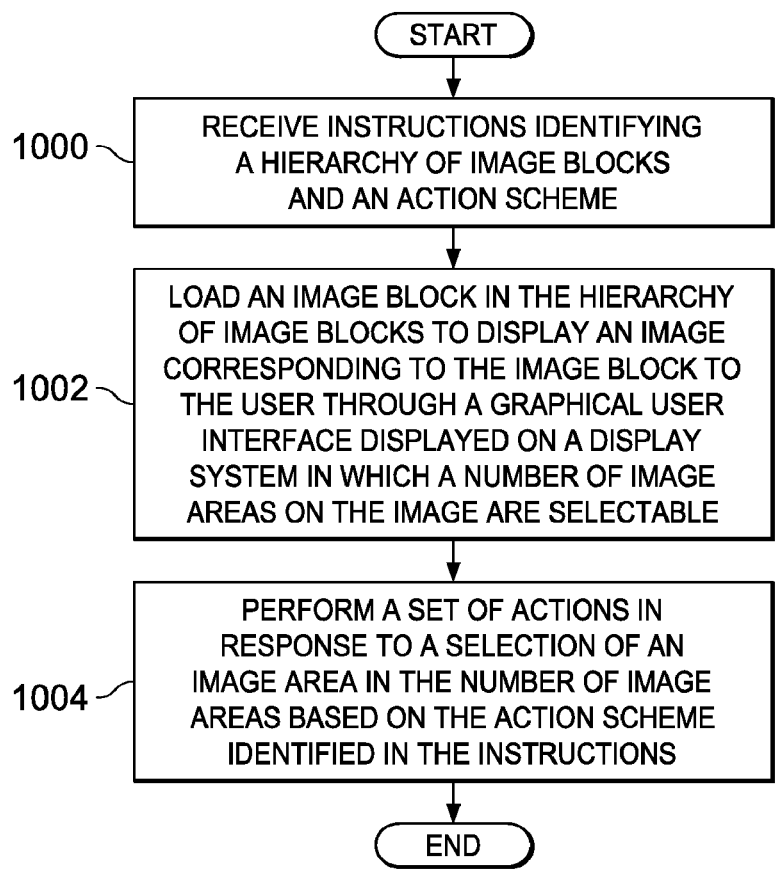
FIG. 10 is an illustration of a process for visually querying data about an object in the form of a flowchart in accordance with an illustrative embodiment.

With reference now to FIG. 10, an illustration of a process for visually querying data about an object is depicted in the form of a flowchart in accordance with an illustrative embodiment. The process illustrated in FIG. 10 may be implemented using visual query system 118 in FIG. 1.

The process begins by receiving instructions identifying a hierarchy of image blocks and an action scheme at a controller in the visual query system (operation 1000). The hierarchy of image blocks and the action scheme may be implemented in a manner similar to hierarchy of image blocks 138 and action scheme 140, respectively, described in FIG. 1.

Next, an image block in the hierarchy of image blocks is loaded to display an image corresponding to the image block to the user through a graphical user interface displayed on a display system in which a number of image areas on the image are selectable (operation 1002). Next, a set of actions are performed in response to a selection of an image area in the number of image areas based on the action scheme identified in the instructions (operation 1004), with the process terminating thereafter.

Figure 11:
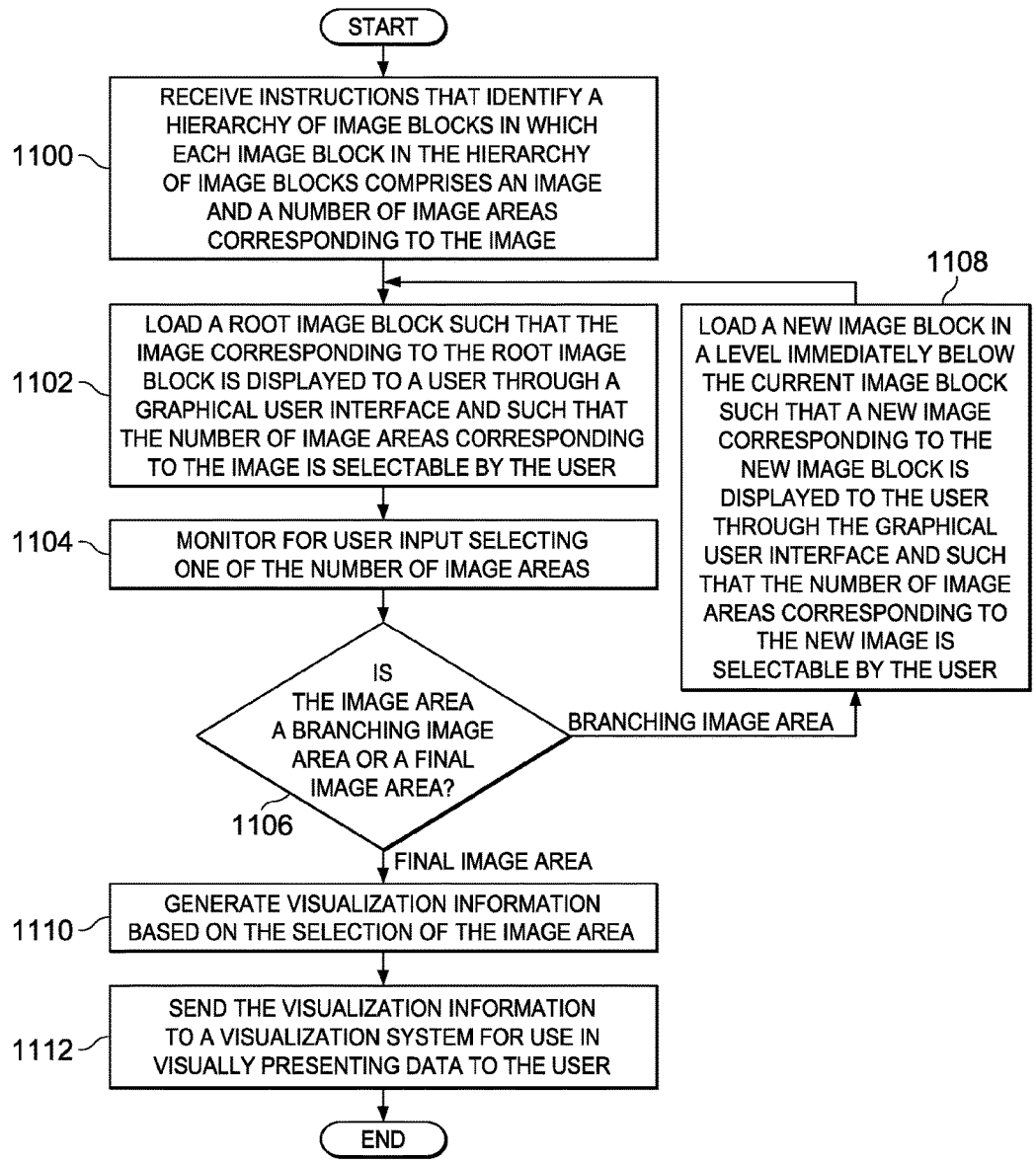
FIG. 11 is an illustration of a process for visually querying data about an object in the form of a flowchart in accordance with an illustrative embodiment.

With reference now to FIG. 11, an illustration of a process for visually querying data is depicted in the form of a flowchart in accordance with an illustrative embodiment. The process illustrated in FIG. 11 may be implemented using visual query system 118 in FIG. 1.

The process begins by receiving instructions that identify a hierarchy of image blocks in which each image block in the hierarchy of image blocks comprises an image and a number of image areas corresponding to the image (operation 1100). Next, a root image block is loaded such that the image corresponding to the root image block is displayed to a user through a graphical user interface and such that the number of image areas corresponding to the image is selectable by the user (operation 1102).

The process monitors for user input selecting one of the number of image areas (operation 1104). In response to a selection of an image area by a user, a determination is made as to whether the image area is a branching image area or a final image area (operation 1106). If the image area selected is a branching image area, a new image block in a level immediately below the current image block is loaded such that a new image corresponding to the new image block is displayed to the user through the graphical user interface and such that the number of image areas corresponding to the new image is selectable by the user (operation 1108).

Next, the process returns to operation 1102 as described above. However, with reference again to operation 1106, if the image area selected is a final image area, visualization information is generated based on the selection of the image area (operation 1110).

In operation 1110, the visualization information may be generated based on the results of a query run according to parameters selected based on the selection of the image area and based on the instructions. The visualization information identifies the portion of data about an object to visually present to the user with respect to a spatial region, a number of visualization effects to be used when visually presenting the data to the user, and/or other types of information. Thereafter, the visualization information is sent to a visualization system for use in visually presenting data to the user (operation 1112), with the process terminating thereafter.

Figure 12:
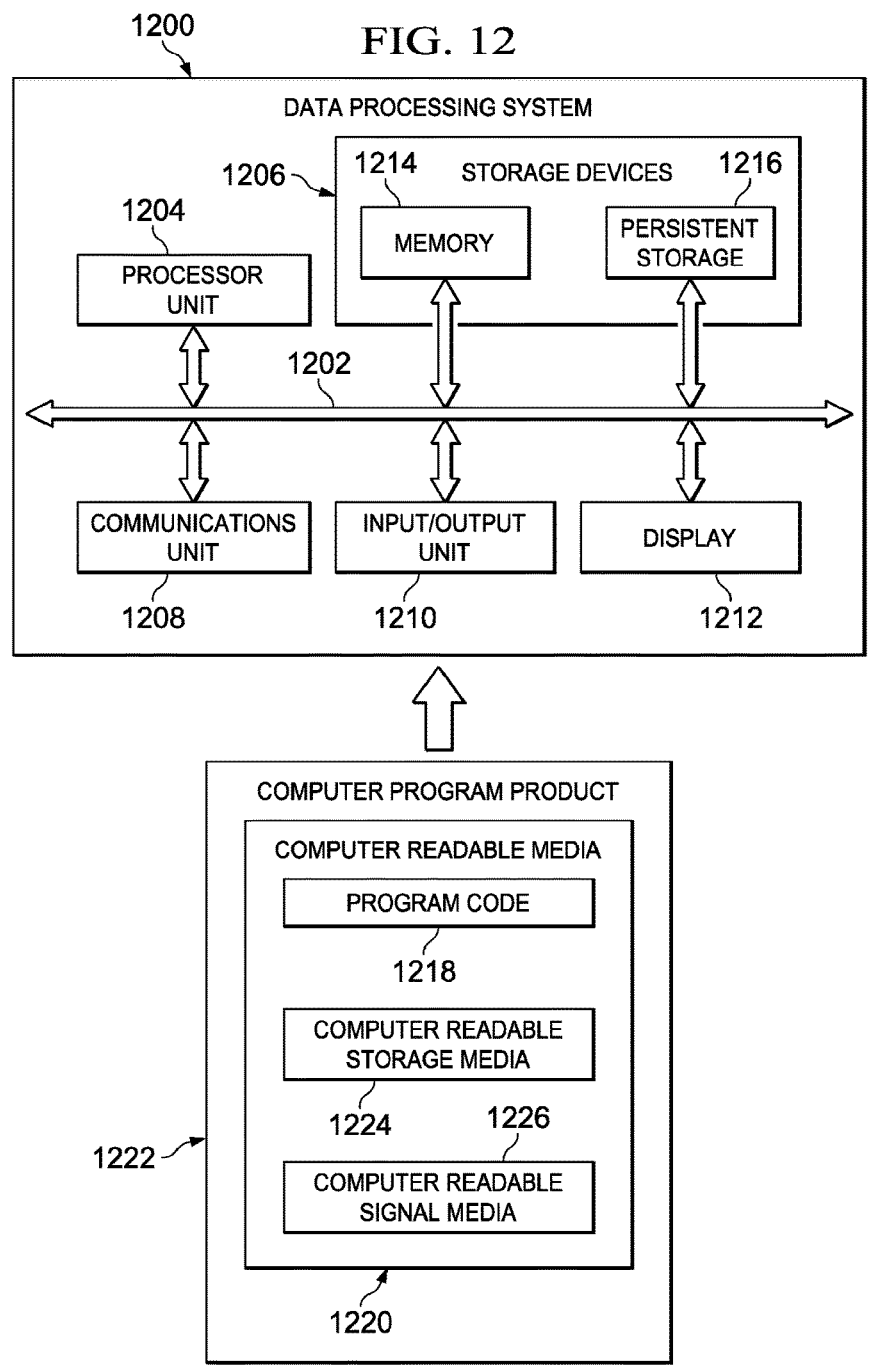
FIG. 12 is an illustration of a data processing system in the form of a block diagram in accordance with an illustrative embodiment.

Turning now to FIG. 12, an illustration of a data processing system in the form of a block diagram is depicted in accordance with an illustrative embodiment. Data processing system 1200 may be used to implement one or more computers in computer system 103 in FIG. 1. As depicted, data processing system 1200 includes communications framework 1202, which provides communications between processor unit 1204, storage devices 1206, communications unit 1208, input/output unit 1210, and display 1212. In some cases, communications framework 1202 may be implemented as a bus system.

Processor unit 1204 is configured to execute instructions for software to perform a number of operations. Processor unit 1204 may comprise a number of processors, a multi-processor core, and/or some other type of processor, depending on the implementation. In some cases, processor unit 1204 may take the form of a hardware unit, such as a circuit system, an application specific integrated circuit (ASIC), a programmable logic device, or some other suitable type of hardware unit.

Instructions for the operating system, applications, and/or programs run by processor unit 1204 may be located in storage devices 1206. Storage devices 1206 may be in communication with processor unit 1204 through communications framework 1202. As used herein, a storage device, also referred to as a computer readable storage device, is any piece of hardware capable of storing information on a temporary and/or permanent basis. This information may include, but is not limited to, data, program code, and/or other information.

Memory 1214 and persistent storage 1216 are examples of storage devices 1206. Memory 1214 may take the form of, for example, a random access memory or some type of volatile or non-volatile storage device. Persistent storage 1216 may comprise any number of components or devices. For example, persistent storage 1216 may comprise a hard drive, a flash memory, a rewritable optical disk, a rewritable magnetic tape, or some combination of the above. The media used by persistent storage 1216 may or may not be removable.

Communications unit 1208 allows data processing system 1200 to communicate with other data processing systems and/or devices. Communications unit 1208 may provide communications using physical and/or wireless communications links.

Input/output unit 1210 allows input to be received from and output to be sent to other devices connected to data processing system 1200. For example, input/output unit 1210 may allow user input to be received through a keyboard, a mouse, and/or some other type of input device. As another example, input/output unit 1210 may allow output to be sent to a printer connected to data processing system 1200.

Display 1212 is configured to display information to a user. Display 1212 may comprise, for example, without limitation, a monitor, a touch screen, a laser display, a holographic display, a virtual display device, and/or some other type of display device.

In this illustrative example, the processes of the different illustrative embodiments may be performed by processor unit 1204 using computer-implemented instructions. These instructions may be referred to as program code, computer usable program code, or computer readable program code and may be read and executed by one or more processors in processor unit 1204.

In these examples, program code 1218 is located in a functional form on computer readable media 1220, which is selectively removable, and may be loaded onto or transferred to data processing system 1200 for execution by processor unit 1204. Program code 1218 and computer readable media 1220 together form computer program product 1222. In this illustrative example, computer readable media 1220 may be computer readable storage media 1224 or computer readable signal media 1226.

Computer readable storage media 1224 is a physical or tangible storage device used to store program code 1218 rather than a medium that propagates or transmits program code 1218. Computer readable storage media 1224 may be, for example, without limitation, an optical or magnetic disk or a persistent storage device that is connected to data processing system 1200.

Alternatively, program code 1218 may be transferred to data processing system 1200 using computer readable signal media 1226. Computer readable signal media 1226 may be, for example, a propagated data signal containing program code 1218. This data signal may be an electromagnetic signal, an optical signal, and/or some other type of signal that can be transmitted over physical and/or wireless communications links.

The illustration of data processing system 1200 in FIG. 12 is not meant to provide architectural limitations to the manner in which the illustrative embodiments may be implemented. The different illustrative embodiments may be implemented in a data processing system that includes components in addition to or in place of those illustrated for data processing system 1200. Further, components shown in FIG. 12 may be varied from the illustrative examples shown.

Figure 13:
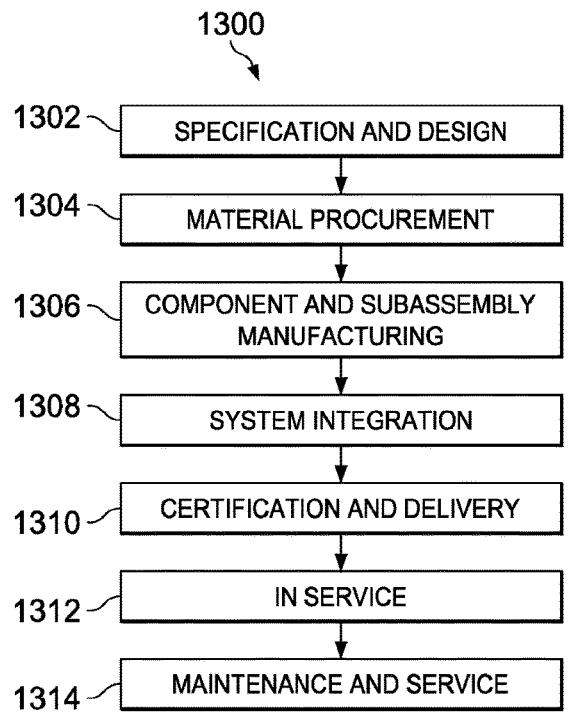
FIG. 13 is an illustration of an aircraft manufacturing and service method in the form of a block diagram in accordance with an illustrative embodiment.
Figure 14:
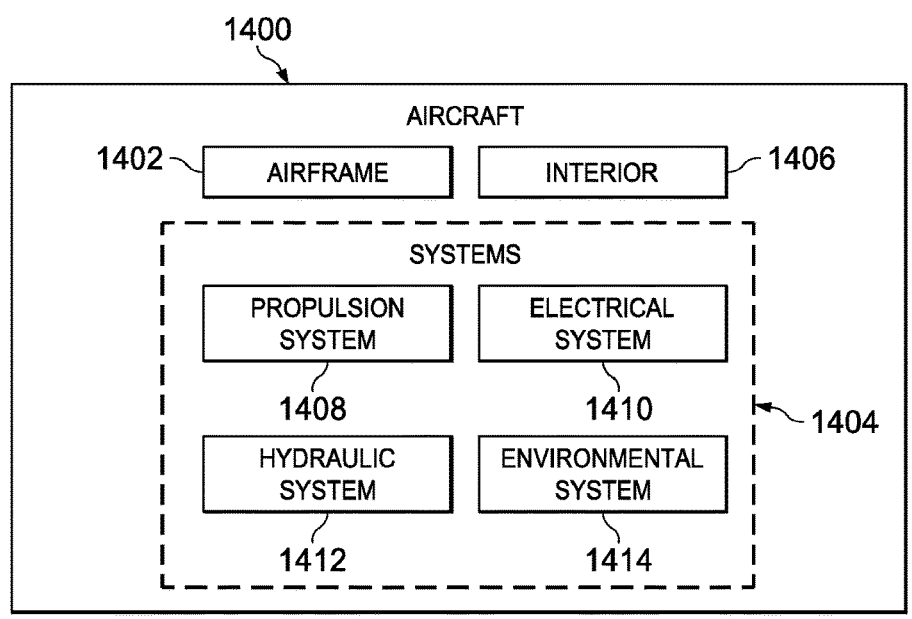
FIG. 14 is an illustration of an aircraft in the form of a block diagram in accordance with an illustrative embodiment.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in the form of a block diagram in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in the form of a block diagram in which an illustrative embodiment may be implemented. In this example, aircraft 1400 is produced by aircraft manufacturing and service method 1300 in FIG. 13 and may include airframe 1402 with systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. For example, visualization system 102 and visual query system 118 in FIG. 1 may be used to identify information for performing tasks during any one of the stages of aircraft manufacturing and service method 1300 in FIG. 1. For example, without limitation, information about the aircraft may be visually queried and viewed by an operator to perform tasks to assemble parts for maintenance, upgrades, refurbishment, and other operations during maintenance and service 1314 may be identified using an illustrative embodiment.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for locating a part within an object, the method comprising:

generating, by a processor, a hierarchy of image blocks using an action scheme and a part, wherein each image block in the hierarchy of image blocks comprises an image of the object;

generating, by the processor, instructions identifying the hierarchy of image blocks, the action scheme, and the part;

communicating, by the processor, the hierarchy of image blocks to a graphical user interface;

identifying, by the processor, an image area in an image block in the hierarchy of image blocks in the graphical user interface, wherein the image area identifies a spatial region within the object;

generating, by the processor, a search window having a type menu indicating a type of search to perform, wherein the type of search is further generated from one of a location within the spatial region within the object or a part number for the part;

generating, by the processor, a query to identify a location of the part within the object, wherein the query is based on the type of search, the spatial region, and the action scheme; and displaying an indicator on an image of the object to indicate the location of the part within the object identified by the query.

2. The computer-implemented method of claim 1 further comprising:
monitoring for user input selecting the image area.

3. The computer-implemented method of claim 2, further comprising:
generating a new image block at a next level in the hierarchy of image blocks; and
displaying a new image corresponding to the new image block in the graphical user interface.

4. The computer-implemented method of claim 2, further comprising:
generating visualization information to be sent to a visualization system for use in visually presenting data of interest to a user.

5. The computer-implemented method of claim 4, wherein generating the visualization information comprises:
running the query to filter the data about the object based on the selection of the image area.

6. The computer-implemented method of claim 5, wherein running the query to filter the data about the object comprises:
running the query to filter the data about the object based on the selection of the image area, wherein the data about the object comprises a number of models for the object and object data.

7. The computer-implemented method of claim 4, wherein generating the visualization information comprises:
generating the visualization information in which the visualization information includes spatial information identifying the spatial region with respect to which the data of interest is to be visually presented to the user.

8. The computer-implemented method of claim 4, wherein generating the visualization information comprises:
generating the visualization information in which the visualization information includes a number of visualization effects to be used by the visualization system when visually presenting the data of interest to the user.

9. The computer-implemented method of claim 1, wherein the object is an aircraft.

10. The computer-implemented method of claim 9, wherein the hierarchy of image blocks comprises a root image block upon which a remainder of the image blocks is based, and wherein the root image block is selected from one of an image of a manufacturing facility within which the aircraft is assembled or an image of the aircraft.

11. The computer-implemented method of claim 10, wherein the indicator representing the location of the part identified by the query is displayed on the root image.

12. The computer-implemented method of claim 1, wherein the identification of the image area in the image block in the hierarchy of image blocks comprises:
generating a new image block at a next level in the hierarchy of image blocks to display a new image corresponding to the new image block to the user through the graphical user interface.

13. The computer-implemented method of claim 1, wherein the action scheme includes displaying a next level of hierarchy in the hierarchy of image blocks.

14. An apparatus comprising:
a visual query system having a processor configured to:
generate a hierarchy of image blocks using an action and a part within an object wherein each image block in the hierarchy of image blocks comprises an image of the object;
generate instructions identifying the hierarchy of image blocks, the action scheme, and the part;
communicate the hierarchy of image blocks to a graphical user interface;
identify an image area in an image block in the hierarchy of image blocks in the graphical user interface, wherein the image area identifies a spatial region within the object;
generate a search window having a type menu indicating a type of search to perform; wherein the type of search is further generated from one of a location within the spatial region within the object or a part number for the part;
generate a query to identify a location of the part within the object, wherein the query is based on the type of search, the spatial region, and the action scheme; and
display an indicator on an image of an object to represent the location of the part within the object identified by the query.

15. The apparatus of claim 14, wherein the visual query system comprises:
a controller configured to receive the instructions and configured to receive user input selecting the image area through the graphical user interface.

16. The apparatus of claim 14, wherein the visual query system is further configured to:
load a new image block at a next level in the hierarchy of image blocks; and
display a new image corresponding to the new image block in the graphical user interface.

17. The apparatus of claim 14, wherein the object is an aircraft.

18. The apparatus of claim 17, wherein the hierarchy of image blocks comprises a root image block upon which a remainder of the image blocks is based, and wherein the root image block is an image of a manufacturing facility within which the aircraft is assembled.

19. The apparatus of claim 14 further comprising:
the visualization system, wherein the visualization system and the visual query system form an integrated visualizer.

20. The apparatus of claim 19, wherein the integrated visualizer is configured to allow a user to visualize object data for each of a plurality of objects and visually query for a portion of the object data corresponding to one of the plurality of objects based on a number of search criteria in which the object data includes at least one of design data, engineering data, geometry data, attribute data, part data, manufacturing data, production data, maintenance data, or work order data.

* * * * *